United States Patent
Ostroff

(10) Patent No.: US 10,306,872 B2
(45) Date of Patent: Jun. 4, 2019

(54) AQUARIUM CLEANING DEVICE

(71) Applicant: Pier Aquarium, Inc., St. Petersburg, FL (US)

(72) Inventor: Zachary Ostroff, St. Petersburg, FL (US)

(73) Assignee: Pier Aquarium, Inc., St. Petersburg, FL (US)

( * ) Notice: Subject to any disclaimer, the term of this patent is extended or adjusted under 35 U.S.C. 154(b) by 180 days.

(21) Appl. No.: 15/402,321

(22) Filed: Jan. 10, 2017

(65) Prior Publication Data

US 2018/0192622 A1  Jul. 12, 2018

(51) Int. Cl.
*B08B 3/02* (2006.01)
*B08B 9/08* (2006.01)
*A01K 63/10* (2017.01)
*B08B 3/10* (2006.01)

(52) U.S. Cl.
CPC .............. *A01K 63/10* (2017.01); *B08B 3/024* (2013.01); *B08B 3/10* (2013.01); *B08B 9/08* (2013.01); *B08B 2203/0229* (2013.01)

(58) Field of Classification Search
CPC ........... A01K 63/00; A01K 63/10; A47L 1/08; A47L 1/095; A47L 1/13
See application file for complete search history.

(56) References Cited

U.S. PATENT DOCUMENTS

| | | | |
|---|---|---|---|
| 3,609,793 A | 10/1971 | Kaftan | |
| 5,628,271 A * | 5/1997 | McGuire | B08B 3/024 114/222 |
| 5,988,109 A | 11/1999 | Rofen | |
| 8,783,991 B2 | 7/2014 | Trudeau | |
| 2004/0194237 A1 | 10/2004 | Walton | |
| 2005/0268421 A1 | 12/2005 | Ho | |
| 2006/0174840 A1 * | 8/2006 | Rafailovich | A47L 1/03 119/264 |
| 2007/0017558 A1 * | 1/2007 | Walton | B08B 3/02 134/109 |
| 2008/0105211 A1 | 5/2008 | Deng | |
| 2014/0237740 A1 | 8/2014 | Kauffman | |
| 2018/0020645 A1 * | 1/2018 | Beranguer | B24C 3/06 119/264 |

* cited by examiner

Primary Examiner — Spencer E Bell
(74) Attorney, Agent, or Firm — Lewellyn Law, PLLC; Stephen Lewellyn

(57) ABSTRACT

An aquarium cleaning device includes an isolation zone forming member having opposing first and second sides. First and second liquid passages are formed through the member between the first and second sides, each of the first and second liquid passages having an opening on the second side. A gasket is secured to the isolation zone forming member and forms a loop around the openings of the first and second liquid passages. The gasket is disposed to create sealing contact against an aquarium wall when the isolation zone forming member is held against the aquarium wall. An input tube is fluidically connected to the first liquid passage and an output tube is fluidically connected to the second liquid passage.

9 Claims, 4 Drawing Sheets

AQUARIUM CLEANING DEVICE

FIELD OF THE INVENTION

The present invention relates generally to aquarium cleaning devices, and more particularly, relating to a cleaning device for removing encrusting algae from aquarium wall surfaces.

BACKGROUND OF THE INVENTION

Encrusting algae often grows on the interior sidewalls of aquariums. Specifically, in marine aquariums, crustose coralline algae lay down a layer of calcium carbonate and can be very difficult to clean off aquarium walls. Generally, an aquarist will use manual tools to scrape algae off the aquarium sidewalls. Such manual tools include scrub brushes and scrapers and other hand tools that can be held in contact with the sidewalls of the aquarium by hand or through the use of magnets. Often, however, an aquarist cannot gain enough leverage using just these tools alone to remove the algae.

Encrusting algae is especially difficult to remove from aquariums made of acrylic or the like where metal utensils (i.e., razor blades) cannot be used for fear of scratching the acrylic panels. In addition, removing encrusting algae can be difficult in aquariums that having living coral or other structures that positioned close to the sidewalls making reaching the sidewalls difficult with tools. In many cases the use of chemicals may be needed to break up or loosen the algae along the sidewalls making removing the algae much easier.

Vinegar and other weak acids are commonly used to dissolve coralline algae off of aquarium equipment, but these items must be immersed in the chemical which not possible for an aquarium unless the animals are removed and the tank is drained. This process is difficult and time consuming and puts unnecessary stress on the animals in transferring between habitats.

Thus, there is a need for a new aquarium cleaning device that facilitates the removal of encrusting algae from aquarium walls using a chemical such as vinegar or acid without needing to remove the animals and the water from the aquarium.

SUMMARY OF THE INVENTION

In view of the foregoing problems with existing aquarium cleaning devices, embodiments of the present invention provide a new aquarium cleaning device that substantially departs from the concepts and designs of the prior art, and in doing so provides a new aquarium cleaning device that can provide an aquarist with the ability to clean the interior of the aquarium sidewalls without damaging the sidewalls or contaminating the aquarium.

In one aspect, an aquarium cleaning device of the present invention provides the ability to expose the interior surface of aquarium sidewalls with a chemical solution in order to help remove encrusting algae without the chemical solution flowing into the aquarium water.

In general, in one aspect, an aquarium cleaning device includes an isolation zone forming member having opposing first and second sides. First and second liquid passages are formed through the member between the first and second sides. Each of the first and second liquid passages having an opening on the second side. A gasket is secured to the isolation zone forming member and forms a loop around the openings of the first and second liquid passages. The gasket is disposed to create sealing contact against an aquarium wall when the isolation zone forming member is held against the aquarium wall. An input tube is fluidically connected to the first liquid passage and an output tube is fluidically connected to the second liquid passage.

When the isolation zone forming member is pressed against the interior surface of the aquarium sidewall and isolation zone is created between the isolation zone forming member and the interior surface. A chemical solution is then circulated through this isolation zone via the input and output tubes. The sealing contact between the gasket and the interior surface prevent the chemical solution from flowing into the surrounding aquarium water.

In general, in another aspect, the aquarium cleaning device may further include a transfer tube, a liquid pump, and a chemical reservoir. The input tube is connected at one end to the first liquid passage and is connected at the opposite end to the chemical reservoir. The output tube is connected at one end to the second liquid passage and at the opposite end is connected to the inlet of the liquid pump. And the transfer tube is connected at one end to the outlet of the liquid pump and is connected at the opposite end to the chemical reservoir. Operating the pump creates a negative pressure in the isolation zone that further presses the isolation zone forming member against the interior surface and also circulates the chemical solution.

In general, in another aspect, the aquarium cleaning device may further include a pair of magnets. One that is secured to the isolation zone forming member and the other that is positioned on the exterior surface of the aquarium sidewall. The magnetic attraction between the two magnets holds the isolation zone forming member against the aquarium sidewall. Additionally, the second magnet may be moved along the aquarium sidewall to position the isolation zone forming member via the magnetic force between the two magnets.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages, and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
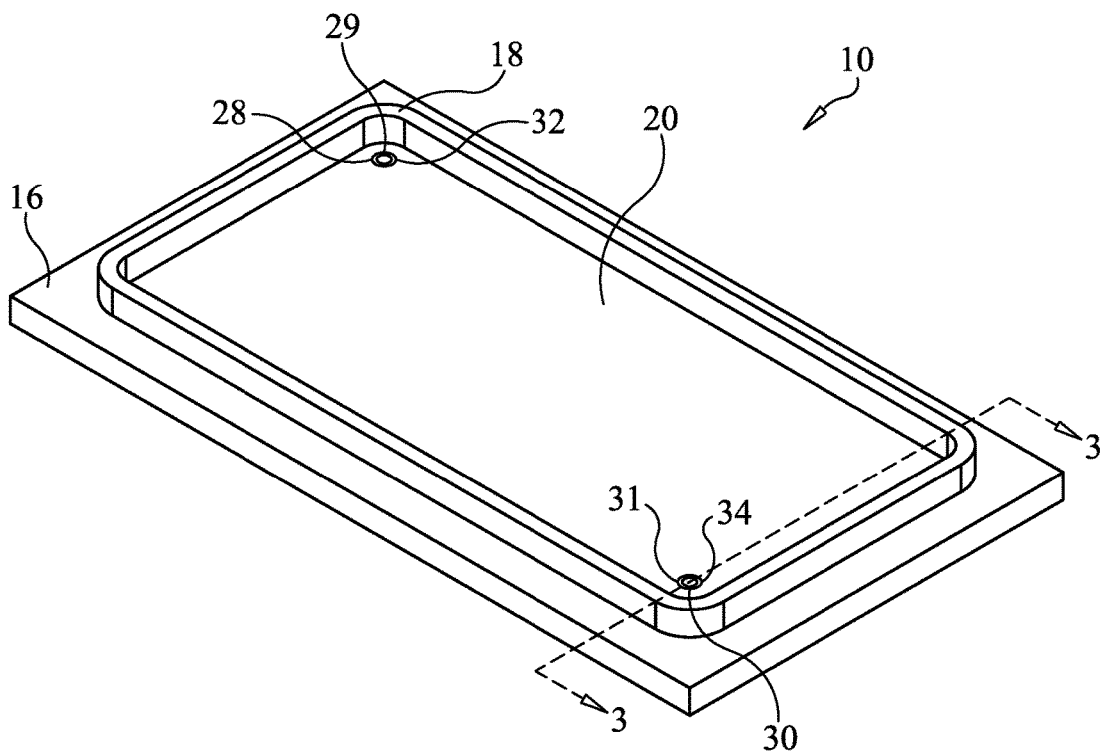
FIG. 1 is bottom perspective view of an aquarium cleaning device constructed in accordance with the principles of an embodiment of the present invention.
Figure 2:
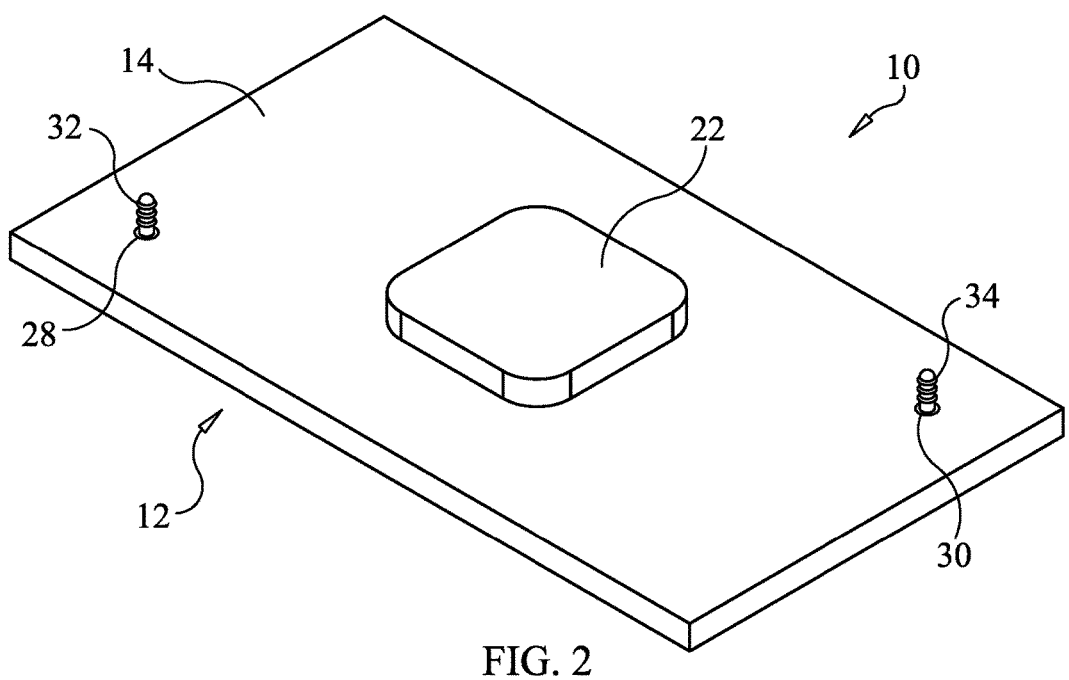
FIG. 2 is a top perspective view of the aquarium cleaning device constructed in accordance with the principles of an embodiment of the present invention.
Figure 3:
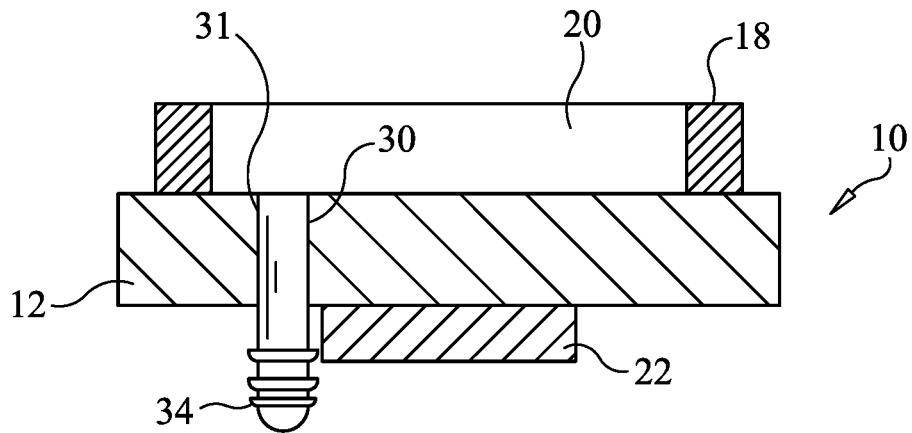
FIG. 3 is a cross-sectional view of the aquarium cleaning device taken along the line 3-3 in FIG. 1.

With reference to FIGS. 1-5, there is representatively illustrated a new aquarium cleaning device that is constructed in accordance with an embodiment of the present invention and is designated by reference number 10. As discussed in more detail below, the aquarium cleaning device 10 is used to apply chemicals to the interior of an aquarium sidewall to help remove encrusting algae from the sidewall without requiring the aquarium to be drained.

The cleaning device 10 has an isolation zone forming member 12 that is constructed of a rigid material, such as, for example plastic. Ideally the material is inert and safe for use in aquarium water and also will not react with chemical solutions, such as, for example vinegar. Member 12 has opposing first and second sides 14 and 16. A rubber gasket 18 is attached to member 12 so that the member may be sealed against the interior surface 25 of aquarium wall 24 to form an isolation zone 20.

In the representatively illustrated embodiment, rubber gasket 18 is affixed to side 16 and extends in a continuous loop forming a perimeter of the isolation zone 20. The gasket has a thickness such that when member 12 is pressed up against the aquarium wall 24 the side 16 is spaced a distance from the interior surface 25 of the wall. The gasket 18 can be affixed via an adhesive, by seating into a groove formed in member 12, or any other suitable method.

The cleaning device 10 further includes a pair of magnets. The first magnet 22 is affixed to member 12, representatively, on side 14. The second magnet 26 is moveably positioned along the exterior of the aquarium wall 24. When the second magnet 26 is positioned near the first magnet 22, they are attracted toward one another. The magnetic force between the magnets 22 and 26 operates to secure member 12 against the aquarium sidewall 24 and compress the gasket 18 against the interior surface 25 to form a sealing contact between the gasket and the interior surface 25, thereby creating isolation zone 20. The sealing contact between the gasket 18 and the interior surface 15 ensures that any chemical located within the isolation zone 20 is prevented from flowing into the surrounding aquarium water.

The member 12 includes liquid passages 28 and 30 extending between opposite sides 14 and 16 so that fluid may be communicated through member from the opposite sides. As shown, the liquid passages 28 and 30 having openings 29 and 31, respectively, on side 16 that are located inwardly of gasket 18. In other words, gasket 18 forms a loop around openings 29 and 31. In the illustrated embodiment, hose barb fittings 32 and 34 are connected to passages 28 and 30, respectively. As further discussed below, passages 28 and 30 are used to circulate a chemical solution through the isolation zone 20. Importantly, passages 28 and 30 are positioned diagonally opposite of one another, as best shown in FIG. 1, which ensures one liquid passage will always be position above the other when the isolation member 12 is rotated against aquarium sidewall 24. This allows for all of the liquid entering the isolation zone 20 to exit the isolation zone regardless of the liquid density or the positioning of member 12 along the aquarium sidewall 24.

Figure 4:
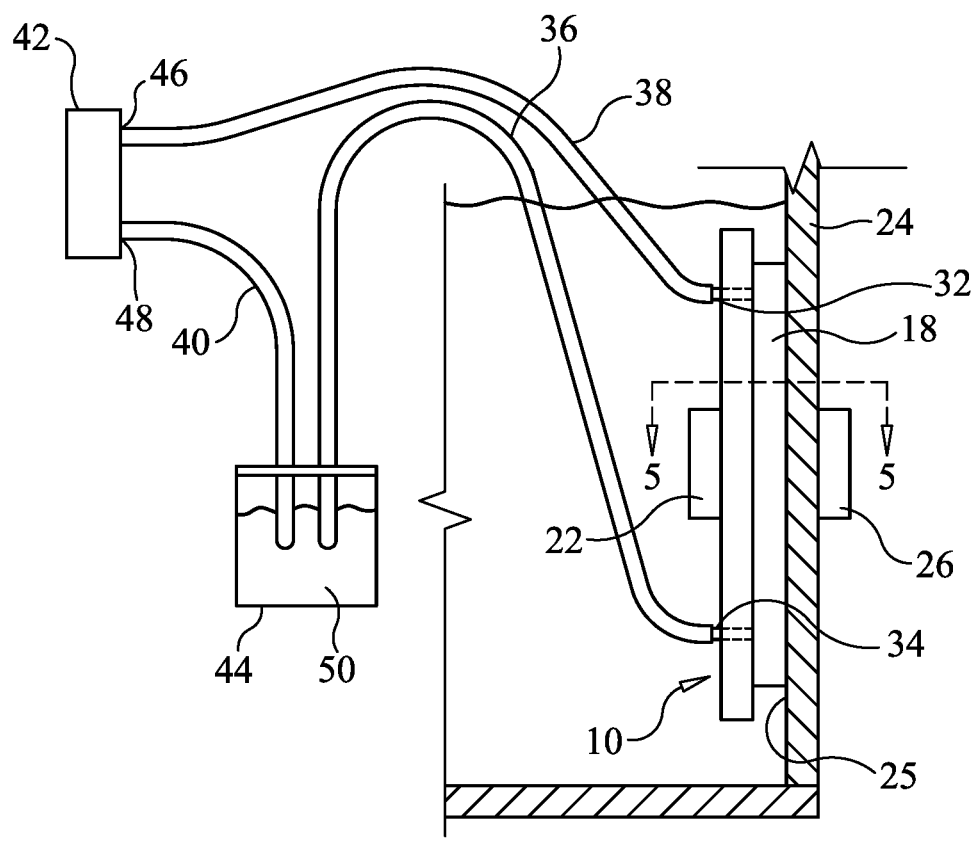
FIG. 4 is a diagrammatic, cross-sectional view of an aquarium showing the cleaning device in-use, secured to a sidewall of the aquarium.
Figure 5:
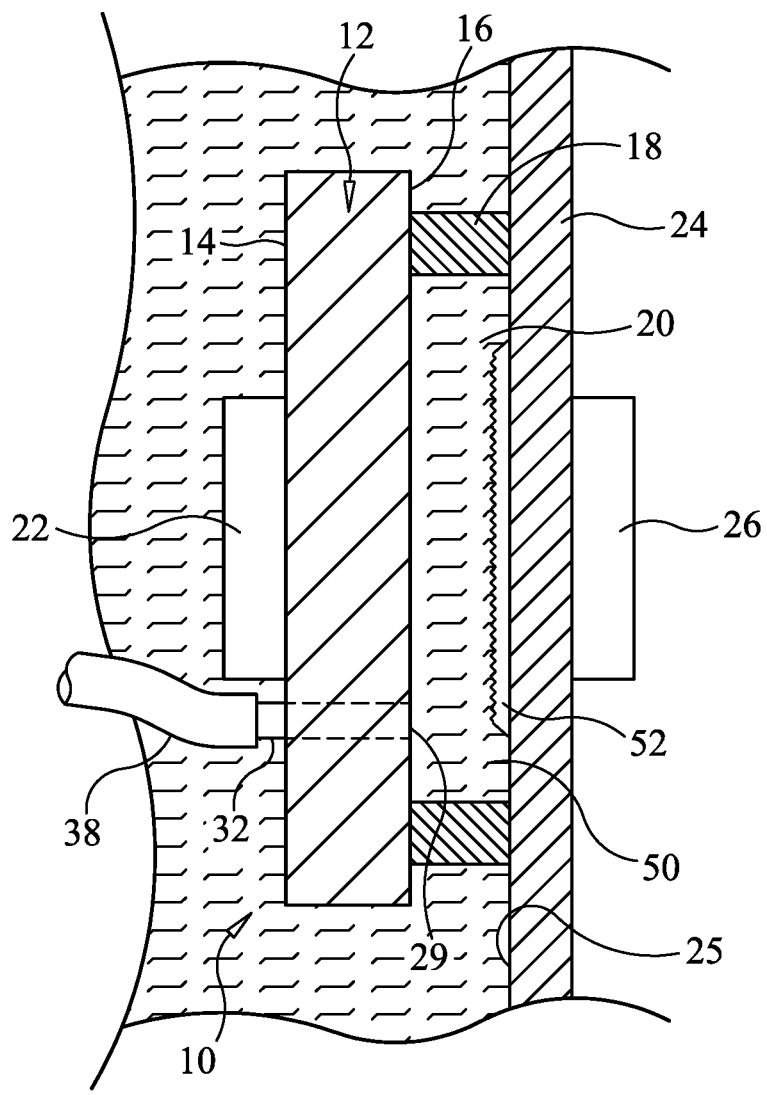
FIG. 5 is a cross-sectional view of the aquarium cleaning device taken along the line 5-5 in FIG. 4.

As best shown in FIG. 4, the aquarium cleaning device 10 further includes an inlet tube 36, an outlet tube 38, a transfer tube 40, a liquid pump 42, and a chemical reservoir 44. The inlet tube 36 is connected at one end to fitting 34 and the other end is fluidically connected to a chemical reservoir 44. In the depicted embodiment, tube 36 is connected to the chemical reservoir 44 by emersion into the reservoir, but it could be connected to the reservoir by any suitable fitting or coupling. The outlet tube 38 is connected at one end to fitting 32 and is connected at the opposite end to the inlet 46 of the liquid pump 42. The transfer tube 40 is connected at one end to the outlet 48 of the liquid pump 42 and is fluidically connected at the opposite end to the reservoir 44. In the depicted embodiment, tube 40 is connected to the chemical reservoir 44 by emersion into the reservoir, but it could be connected to the reservoir by any suitable fitting or coupling.

In operation, pump 42 pumps liquid from the isolation zone 20 through tube 38 and into the chemical reservoir 44 through tube 40. Pumping liquid from the isolation zone 20 creates a negative pressure inside the isolation zone that further presses the isolation member 12 against the interior surface 25 and increases the sealing contact between the gasket 18 and the interior surface. In addition, if the seal between the gasket 18 and interior surface 25 should develop a leak, the negative pressure in the isolation zone 20 prevents chemical 50 from flowing out of the isolation zone and into the surrounding water. Rather, the surrounding aquarium water would be drawn into the isolation zone 20 through the leak, which would not endanger the aquarium livestock.

Further, the negative pressure within the isolation zone 20 creates suction on tube 36 that causes chemical 50 to flow from the chemical reservoir 44 through the tube and into the isolation zone. Once in the isolation zone 20, the chemical 50 breaks down encrusting algae 52 that is located on the interior surface 25 and disposed within the isolation zone. After a period of time, the encrusting algae 52 is easier to remove from the aquarium sidewall with manual tools.

When the pump 42 is initially started, the isolation zone 20 will contain mostly aquarium water. To avoid diluting chemical 50 located within the reservoir 44, the water can be pumped into a separate container by placing the end of the transfer tube 40 into that container for a short period of time to clear the aquarium water. Once the water is cleared from the isolation zone 20, the transfer tube 40 is then placed back into the chemical reservoir 44 to recirculate the chemical.

The isolation member 12 may be moved to a different location on the sidewall 24 by moving magnet 26 which causes magnet 22 and the isolation member to follow along the interior surface 25 of the sidewall by the magnetic force between the magnets. In some instances, the negative pressure in the isolation zone 20 might make it difficult to move the isolation member 12. In this instance, the liquid flow through the isolation zone 20 may be reversed to relieve some of the negative pressure and make moving the isolation member 12 easier.

Figure 6:
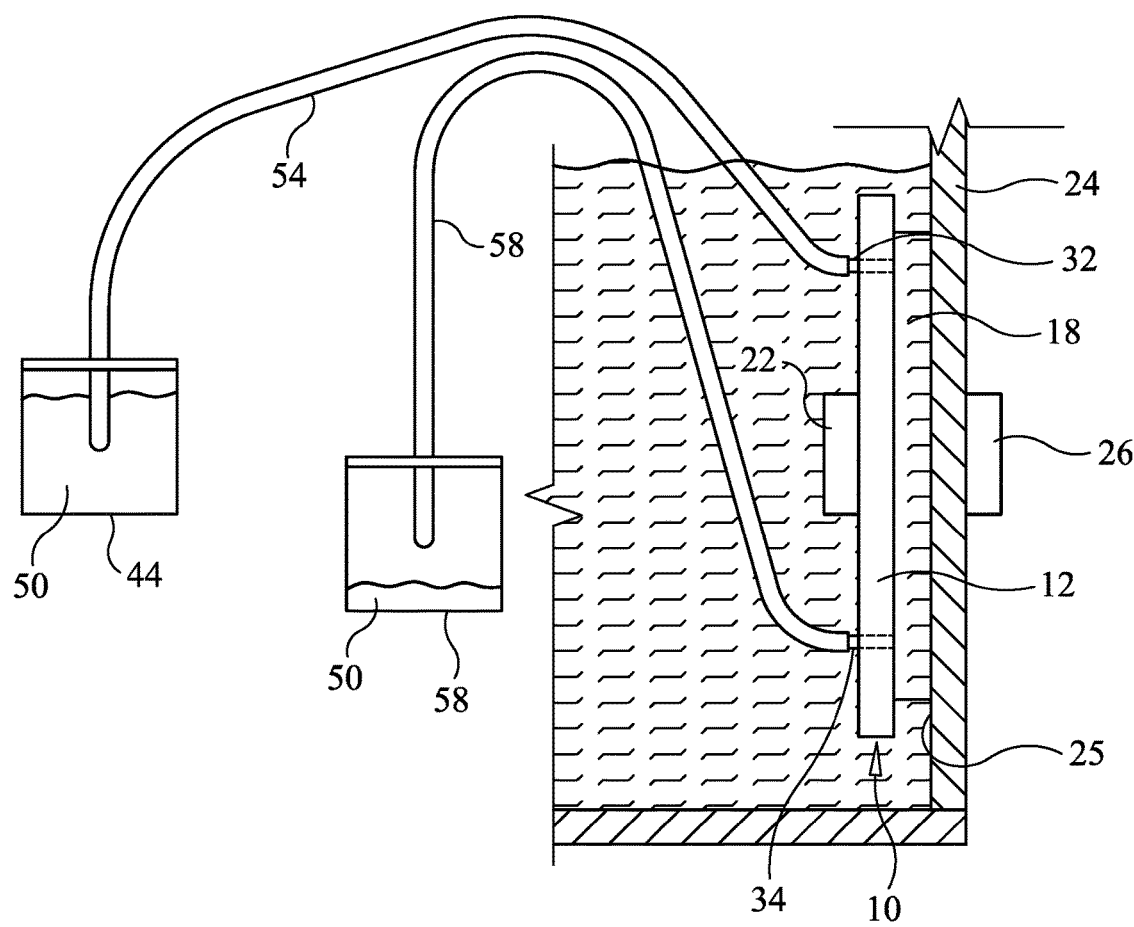
FIG. 6 is a diagrammatic view of an alternative embodiment of an aquarium cleaning device shown in-use.

In an alternative embodiment, illustrated in FIG. 6, the device 10 may be operated without a liquid pump 42 if the magnetic force between magnets 22 and 26 is sufficiently strong to create a sealing contact between the gasket 18 and the interior surface 25 without the negative pressure created by the pump.

In the alternative embodiment, an inlet tube 54 is connected at one end to fitting 32 and the other end is fluidically connected to a chemical reservoir 44. As depicted, tube 54 is connected to the chemical reservoir 44 by emersion into the reservoir, but it could also be connected by any suitable fitting or coupling. An outlet tube 56 is connected at one end to fitting 34 and connected at the opposite end to a used-chemical reservoir 58. Also, as shown, the outlet tube 54 is connected to the used-chemical reservoir 58 by emersion into the reservoir, but it could also be connected by any suitable fitting or coupling. In operation the used-chemical reservoir 58 is positioned at a lower elevation than the chemical reservoir 44 so that a siphon can be created to draw chemical 50 from reservoir 44 into the isolation zone 20 through tube 54 and then from the isolation to the used-chemical reservoir 58 through tube 56.

In an alternative embodiment, not illustrated, it is contemplated that magnets 22 and 26 could be replaced by one or more section cups. However, using magnets is preferred because section cups are more difficult to operate and may not provide a sufficient force to make a good sealing contact between the gasket 18 and the aquarium sidewall 24.

A number of embodiments of the present invention have been described. Nevertheless, it will be understood that various modifications may be made without departing from the spirit and scope of the invention and the following claims.

What is claimed is:

1. An aquarium cleaning device comprising:
   an isolation zone forming member having opposing first and second sides, said isolation zone forming member defining a first liquid passage extending therethrough between said first and second sides and terminating at a first opening on said second side, and said isolation zone forming member defining a second liquid passage extending therethrough between said first and said second sides and terminating at a second opening on said second side;
   a gasket secured to said isolation zone forming member and extending outwardly from said second side and forming a loop around said first and second openings, said gasket disposed to create a sealing contact against an aquarium wall when said isolation zone forming member is held against the aquarium wall to form an isolation zone between said second side and the aquarium wall;
   an input tube fluidically connected to said first liquid passage at said first side;
   an output tube fluidically connected to said second liquid passage at said first side;
   a first magnet fixedly attached to said isolation zone forming member;
   and a second magnet separate of said isolation zone forming member.

2. The aquarium cleaning device of claim 1, wherein said isolation zone forming member has at least one pair of diagonally opposed corners, and wherein said first opening is disposed at one corner and said second opening is disposed at the other corner so that said first and second openings are disposed diagonally relative to one another.

3. The aquarium cleaning device of claim 1, further comprising:
   a transfer tube;
   a liquid pump having an inlet and an outlet; a chemical reservoir; wherein said input tube is connected at one end to said first liquid passage and is connected at the opposite end to said chemical reservoir, wherein said output tube is connected at one end to said second liquid passage and at the opposite end is connected to said inlet of said liquid pump;
   and wherein said transfer tube is connected at one end to said outlet of said liquid pump and is connected at the opposite end to said chemical reservoir.

4. The aquarium cleaning device of claim 3, further comprising:
   a quantity of a chemical solution contained by said chemical reservoir.

5. The aquarium cleaning device of claim 1, further comprising:
   first and second chemical reservoirs;
   wherein said output tube is connected at one end to said first liquid passage and at the opposite end to said first chemical reservoir; and
   wherein said input tube is connected at one end to said second liquid passage and at the opposite end to said second chemical reservoir.

6. An aquarium cleaning system comprising:
   an isolation zone forming member having opposing first and second sides, said isolation zone forming member defining a first liquid passage extending therethrough between said first and second sides and terminating at a first opening on said second side, and said isolation zone forming member defining a second liquid passage extending therethrough between said first and said second sides and terminating at a second opening on said second side;
   a gasket secured to said isolation zone forming member and extending outwardly from said second side and forming a loop around said first and second openings;
   said isolation zone forming member being held against an interior surface of an aquarium sidewall with said gasket in sealing contact with the interior surface and forming an isolation zone between said second side of said isolation zone forming member the interior surface of the aquarium sidewall;
   a chemical solution circulated through said isolation zone by flowing through said first and second liquid passages;
   a first magnet fixedly attached to said isolation zone forming member; and
   a second magnet disposed on an exterior surface of the aquarium sidewall and magnetically attracting said first magnet to hold said isolation zone forming member against the interior surface.

7. The system of claim 6, further comprising:
an input tube fluidically connected to said first liquid passage at said first side;
an output tube fluidically connected to said second liquid passage at said second side;
a transfer tube;
a liquid pump having an inlet and an outlet;
a chemical reservoir;
wherein said input tube is connected at one end to said first liquid passage and is connected at the opposite end to said chemical reservoir, wherein said output tube is connected at one to said second liquid passage and at the opposite end is connected to said inlet of said liquid pump; and
wherein said transfer tube is connected at one end to said outlet of said liquid pump and is connected at the opposite end to said chemical reservoir.

8. The system of claim 7, wherein said isolation zone forming member has at least one pair of diagonally opposed corners, and wherein said first opening is disposed at one corner and said second opening is disposed at the other corner so that said first and second openings are disposed diagonally relative to one another.

9. The system of claim 6, further comprising:
first and second chemical reservoirs;
an output tube connected at one end to said first liquid passage at said first side and at the opposite end to said first chemical reservoir; and
an input is connected at one end to said second liquid passage at said first side and at the opposite end to said second chemical reservoir.

\* \* \* \* \*